United States Patent [19]

Pellenc et al.

[11] Patent Number: 4,733,525

[45] Date of Patent: Mar. 29, 1988

[54] CUTTING MACHINE UTILIZABLE IN AGRICULTURE, VITICULTURE AND ABORICULTURE

[75] Inventors: Roger J. P. Pellenc; Georges Roman, both of Pertuis, France

[73] Assignee: Etablissements Pellenc & Motte, Pertuis, France

[21] Appl. No.: 20,247

[22] Filed: Mar. 2, 1987

Related U.S. Application Data

[63] Continuation of Ser. No. 670,831, Nov. 13, 1984, abandoned.

[30] Foreign Application Priority Data

Nov. 14, 1983 [FR] France ................................ 83 18167

[51] Int. Cl.$^4$ ............................................. A01D 49/00
[52] U.S. Cl. ........................................ 56/503; 56/235; 56/255
[58] Field of Search ...................... 56/255, 14.9, 15.2, 56/15.3, 15.9, 15.7, 233, 234, 235, 503, 136

[56] References Cited

U.S. PATENT DOCUMENTS

| 1,940,216 | 12/1933 | Jacobson | 56/255 |
| 2,016,939 | 10/1935 | Goorh | 56/255 |
| 2,532,174 | 11/1950 | Lieberman | 56/255 |
| 3,261,150 | 7/1966 | Fitzgerald, Sr. | 56/13.6 |
| 3,548,570 | 12/1970 | Knott et al. | 56/503 |
| 3,913,304 | 10/1975 | Jodoin | 50/235 |
| 4,174,601 | 11/1979 | Griffin | 56/503 |
| 4,397,136 | 8/1983 | McLeod | 56/503 |

Primary Examiner—Paul J. Hirsch
Attorney, Agent, or Firm—William A. Drucker

[57] ABSTRACT

A cutting machine for use in agriculture, viticulture and arboriculture has at least one cutting assembly constituted by a plurality of superposed cutting tools, each cutting tool comprising a rotary circular cage provided with peripheral openings, and a member disposed in the cage and taking part in the cutting action, the improvement being that the cage and the member disposed therein are made in a complementary manner and are associated so as to constitute a system of blade and counter blade producing a cut by shearing action.

27 Claims, 12 Drawing Figures

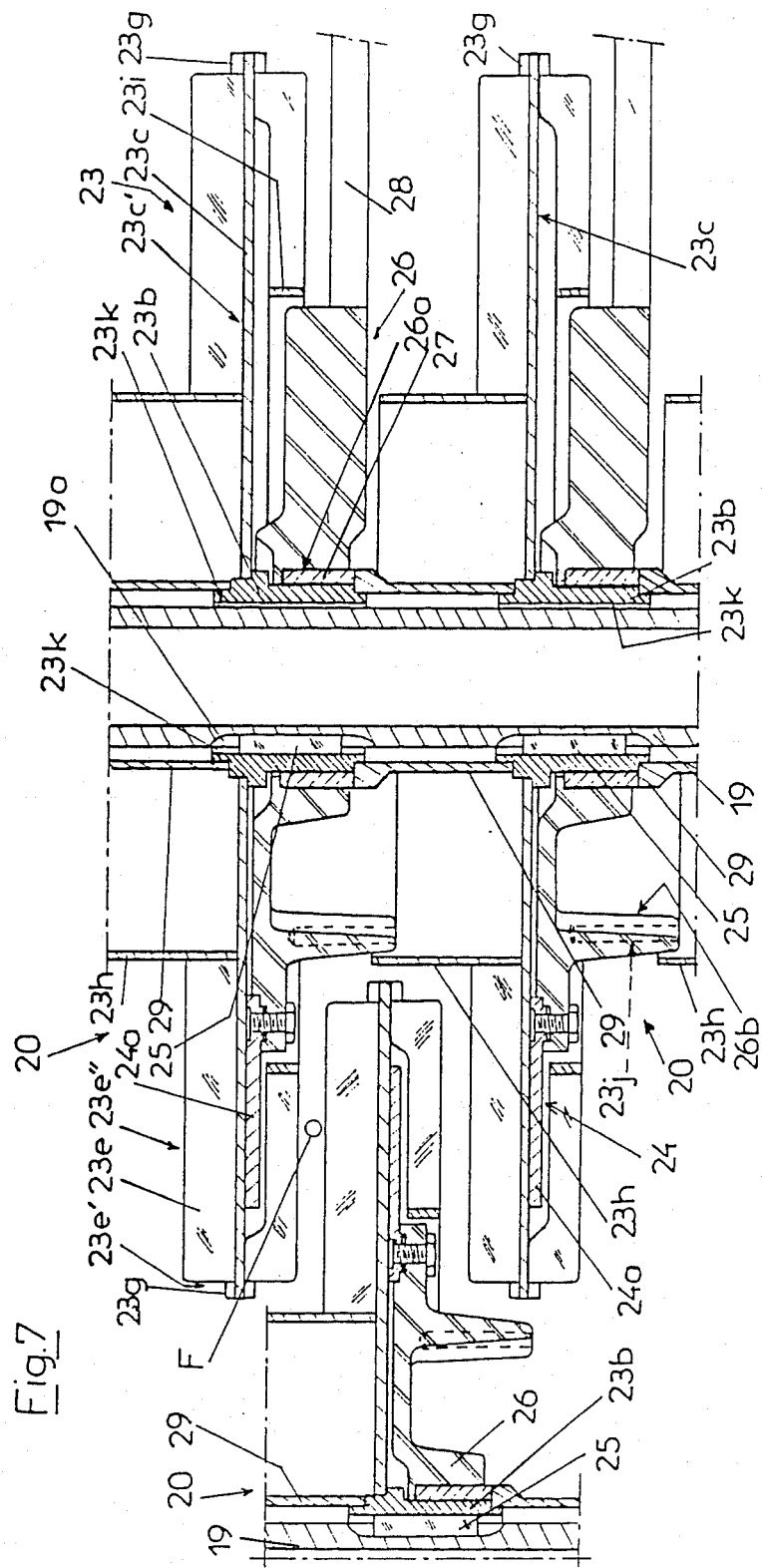

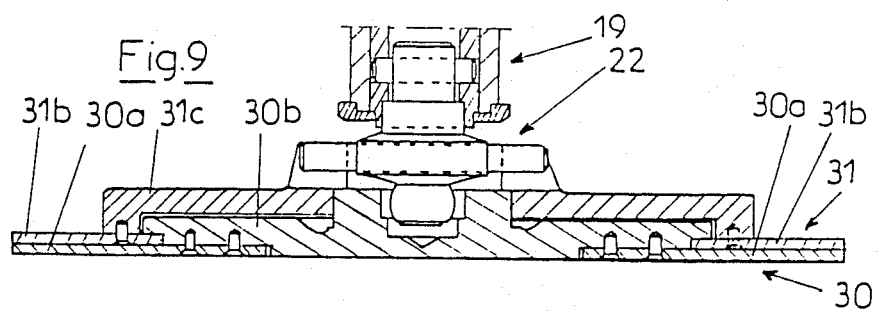
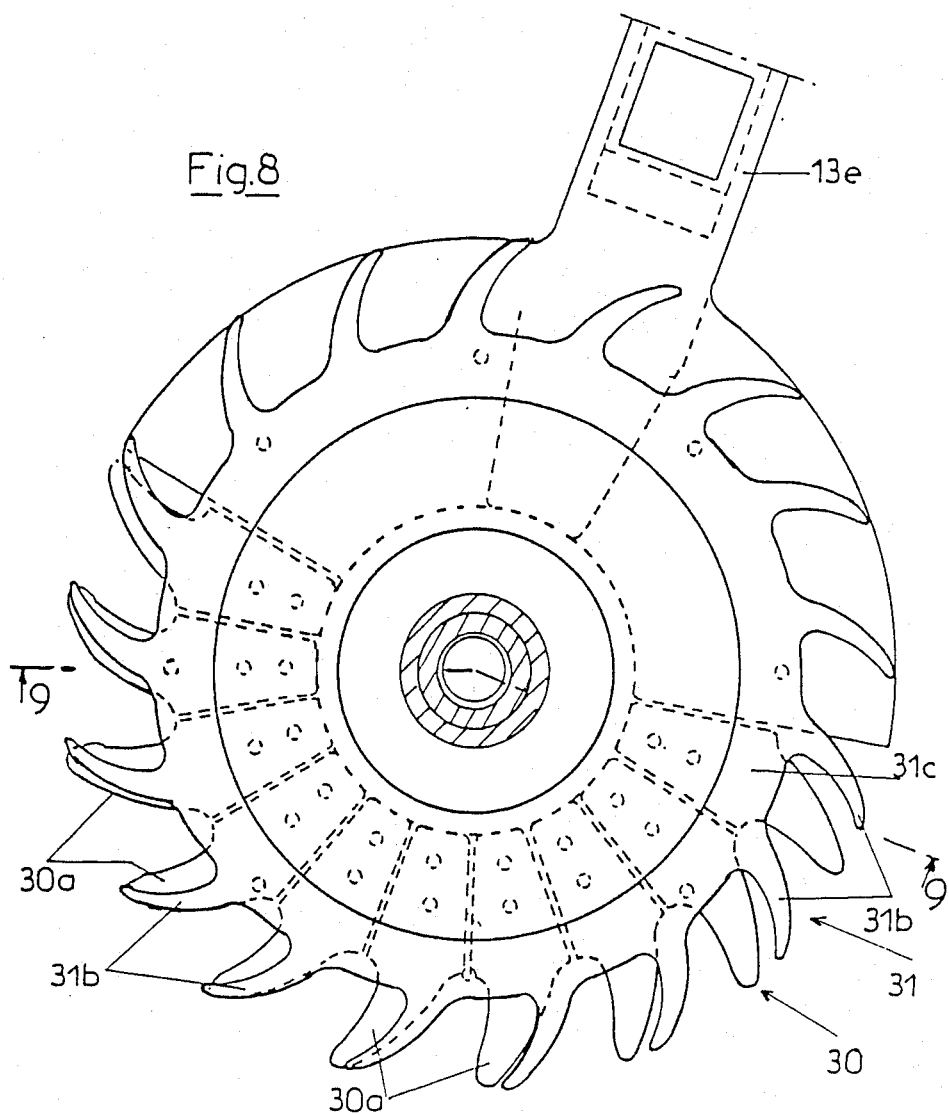

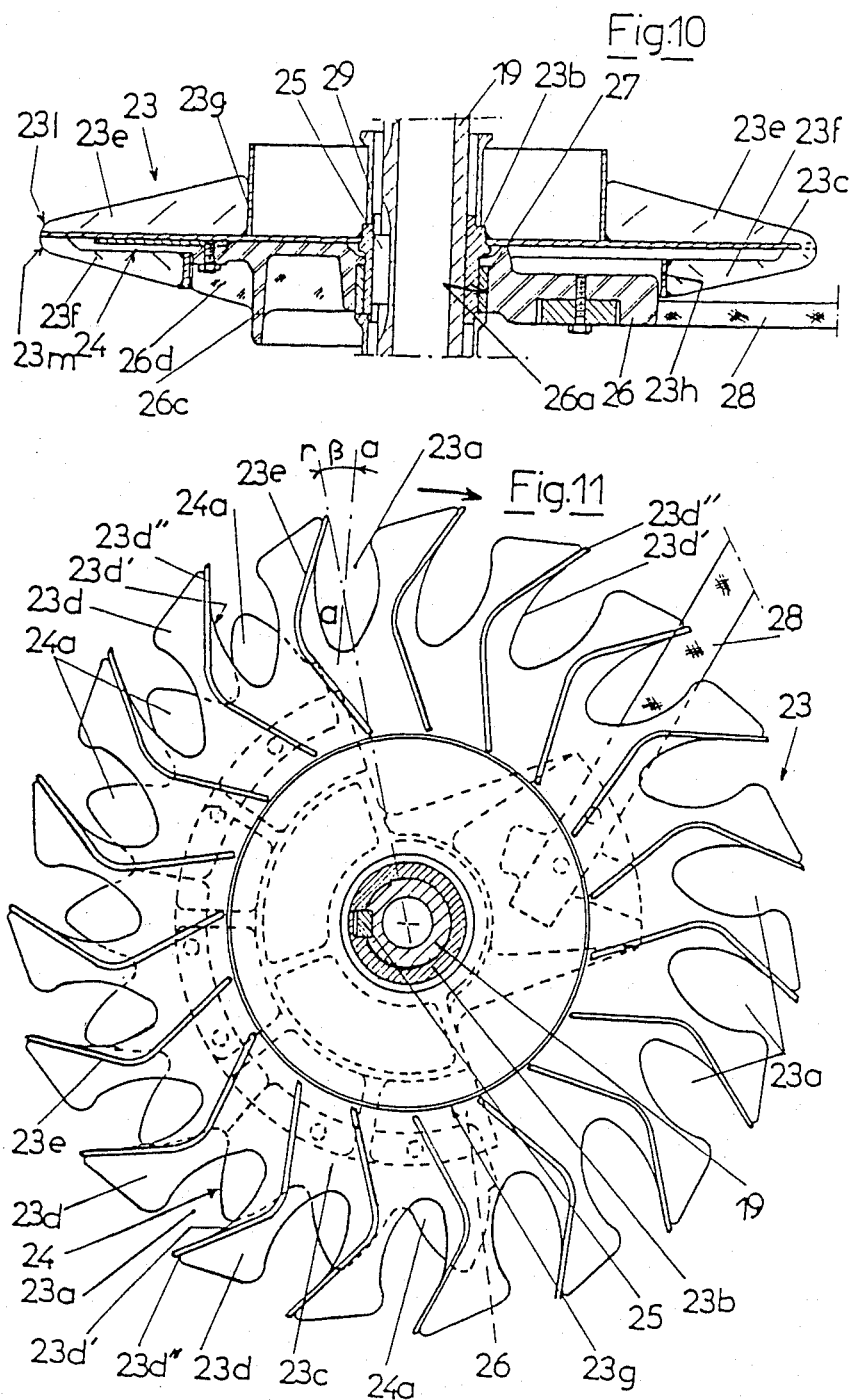

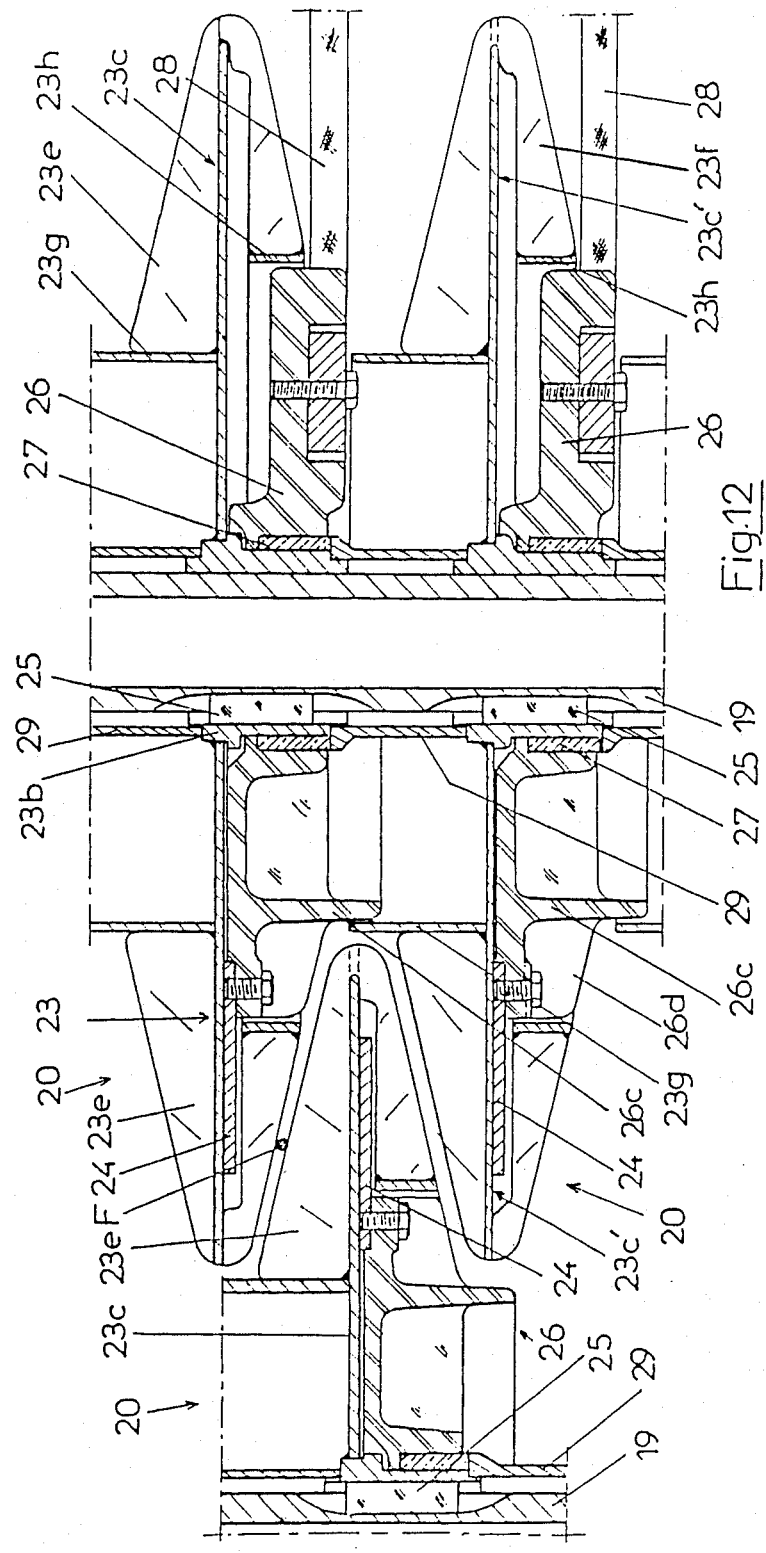

CUTTING MACHINE UTILIZABLE IN AGRICULTURE, VITICULTURE AND ABORICULTURE

This application is a continuation of application Ser. No. 670,831, filed Nov. 13, 1984, now abandoned.

BACKGROUND OF THE INVENTION

The present invention relates to a cutting machine utilisable in agriculture, viticulture and arboriculture, of the kind comprising at least one cutting tool including a circular rotary housing provided with peripheral openings and in which is disposed a member taking part in the cutting action.

According to a very advantageous but in no way limiting application of the invention it permits the construction of a polyvalent machine for the automatic or semi-automatique pre-shaping or pruning of vines and of fruit trees or bushes. In a more particularly interesting manner, in this application the invention permits the construction of a machine for the mechanical pre-shaping or the semi-automatic pruning of trained vines, bushes or trees comprising boughs or branches engaging onto wires supported by spaced stakes.

PRIOR ART

There is known (FR-A-1514889) a cutting machine utilisable in trained plantations and comprising two independent cutting tools each having a rotary knife formed by two pivoted blades and disposed in a housing mounted for free rotation and provided with peripheral teeth and notches, this rotary knife being placed at a distance from the circular upper and lower walls of the housing; each cutting tool thus arranged being mounted at the end of a pivoting arm returned resiliently and permitting the said cutting tool to give way upon contact with the stakes of the fencing and to return to its initial position after passing about these latter.

The deficiencies of such a machine are numerous and its major inconvenience resides in the fact that it does not permit the reduction, in any considerable extent, of the time necessary for carrying out the various very burdensome operations associated with the pruning of trained plantations and, particularly, the pruning of trained vines.

In effect, the pre-shaping carried out by this machine consists of cutting, only at their base, the vine shoots or branches to be eliminated, such that it is subsequently necessary to pull the cut shoots or branches manually to detach them from the wires of the fencing with which they are engaged. This manual pulling of the cut wood is an operation which is long, laborious and accordingly very costly, by reason of the fact that the cut shoots remain strongly attached to the fencing by their tendrils, such that in this case the removal of the pruned wood can represent between 35% and 65% of the total time of the pruning operations. It will likewise be appreciated that the manual pulling of the pruned wood does not permit a direct mechanical gathering of this wood, during the cutting, which makes necessary a third pass through the plantations after the pre-shaping and the pulling of the cut shoots or wood, in order to carry out a crushing to the ground of these latter with the aid of a crusher.

Another great deficiency of this machine is that it does not adapt itself automatically to the variations of level and of spacing of the wires of the fencing, such that it is constantly necessary to be on the watch that its cutting member is correctly positioned with respect to the wires of the same, which necessitates continued adjustments of its position in the course of working, because of the fact that the said wires practically never have constant levels and spacings. This situation gives rise to another inconvenience which resides in the fact that the wires of the fencing can easily be cut by the cutting member.

Another inconvenience of this type of machine arises from the fact that the cut is carried out by rotary blades acting by impact and the speed of rotation of which must thus be very high, which gives rise to risks of dangerous projections capable of striking and injuring its driver, diminishing the quality of the cut which can have the appearance of a hacking action and which necessitates a subsequent manual operation, and also has risks of jamming of the wood and cramming up at the interior of the housing.

On the other hand, by reason of the fact that the housing for the cutting tools is mounted for free rotation, in practice it only turns on contact with the stakes of the fencing, and its tendency towards immobility in other situations favours the entry of the wires of the said fencing between the teeth of the said housing when this latter enters into contact with the said wires which can thus become cut by the rotating blades.

OBJECT OF THE INVENTION

An object of the present invention is, particularly, to provide a machine for the mechanical pre-pruning of vines or other fruit trees and bushes which is not affected by the inconveniences and deficiencies of the known machines for pre-pruning of trained vines and fruit plantations and having, furthermore, a certain number of supplementary advantages of which one of the most interesting is that it constitutes, at the same time, a semi-automatic pruning machine permitting the carrying out mechanically of a large percentage of the total pruning cuts.

SUMMARY OF THE INVENTION

According to the present invention this object is achieved by means of a machine comprising at least one cutting tool and, preferably, a plurality of superposed cutting tools each principally constituted by two complementary members, one of which comprises at least one cutting blade and the other of which is a counter blade, one of these members being made in the form of a rotary circular cage provided with peripheral indentations and in which is disposed the second of the said members the cooperation of which produces a cut by scissoring action.

The advantages offered by this machine which permits the pruning of trained shrubs, bushes and trees are numerous and important.

It permits the total elimination of the long, difficult and extremely burdensome operation formed by the pulling of the pruned wood, thereby considerably reducing the time currently necessary for carrying out the various operations associated with pruning, this reduction being, for example, considerably greater than 50% so far as concerns the pruning of vines. In effect, the machine according to the invention performs a cutting up of the pruned wood into small portions of several centimeters of which only a negligible quantity remains in the fencing.

On the other hand, this machine likewise permits the elimination of the operation of crushing down to the earth of the pruned wood, the small pieces of wood cut up by its cutting assemblies being, in effect, very easily gathered up at the same time as carrying out the operation of pre-pruning and/or pruning, by means of a gathering device comprising, for example, two transporter mats placed at each side of the row of vines or other aligned growth, under the cutting assemblies, and emptying into a basket attached at the rear of the tractor carrying the machine, this furthermore offering the advantage that the gathered portions of wood are not soiled by the earth or mixed with stones.

It will thus be seen that the cutting and the crushing can be carried out automatically in a single passage between the rows.

Furthermore, by reason of the fact that the cut portions of wood are not pulled, the fencing does not undergo any considerable force which might damage it, whilst the shaping and disposition of the cutting tools avoids any risk of catching on and tearing up of the stakes.

Another important advantage of the cutting machine according to the invention is that it does not require any adjustment of the position of the cutting assemblies constituting its cutting head, during the course of working. In effect, during its advance along the row of vines or other trained cultivation, the cutting assemblies automatically absorb the variations of state of the fences such as the differences which may exist so far as concerns the shape and the nature of the stakes, the number of wires, their tension, their position, their diameter, their spacing etc., the wires being constantly guided between the tools of the said cutting assemblies which, furthermore, automatically withdraw themselves upon contact with the stakes, moving round them as near as possible in order also to cut the wood attached to them. On the other hand, no matter what may be their position, the wires of the fencing cannot be cut, even if they are crossed or tangled, or when they are extremely distended as is always the case for the lifting wires in regard to fencings provided with such wires permitting a re-dressing of the vegetation when it is sufficiently advanced. Another advantage of the machine according to the invention arises from the fact its cutting head is constituted of cutting tools stacked one upon the other, about a supporting axle, and that it is thus readily possible to add or to subtract one or more tools in order to adapt the height of the cutting drums as a function of the height of the fencing or of that of the shoots or branches to be eliminated.

Another interest of the machine according to the invention resides in the fact that it presents absolutely no danger at all of projections, by reason of the low speed of rotation of its cutting tools which turn at a circumferential speed equal to or near to the speed of linear advance of the said machine (about 50 rotations/minute in speed of rotation). Accordingly the driver of the machine is not separated by a protective device which reduces visibility and the quality of the work.

Another important advantage of the machine according to the invention is that it performs a very neat cutting of the wood, comparable to that which is obtained with secateurs, such that it can be used, in many cases, to carry out a large percentage of cuts corresponding to the pruning proper, that is to say the cuts not needing any further action by the operator charged with manual pruning carried out following the pre-pruning, this again permitting a considerable reduction of the time necessary for carrying out the operation of manual pruning.

BRIEF DESCRIPTION OF THE DRAWINGS

The above-mentioned and other objects, features and advantages will appear better from the following description and the accompanying drawings, wherein:

FIG. 7 is a partial view in axial section illustrating the interpenetration of the edges of the cutting tools of the two cutting drums shown in their approached working position;

FIG. 8 is a plan view of the lower cutting tool with which the cutting drums are provided;

FIG. 9 is a view in section taken along the line 9—9 of FIG. 8;

FIG. 10 is a view in axial section of a modification of construction of the cutting tool according to the invention;

FIG. 11 is a plan view of FIG. 10;

FIG. 12 is a partial view, in axial section, of two cutting drums, illustrating the interpenetration of the edges of the tools of these drums.

DESCRIPTION OF THE PREFERRED EMBODIMENT

Reference is made to the said drawings to describe an interesting but in no way limiting example of construction of the cutting machine according to the invention which, in accordance with this example, is a portable machine adapted to be coupled to the three-point connecting device of a conventional agricultural tractor T, and suitable more particularly for the pre-pruning and the pruning of vines or trees or bushes which are trained up.

Figure 1:
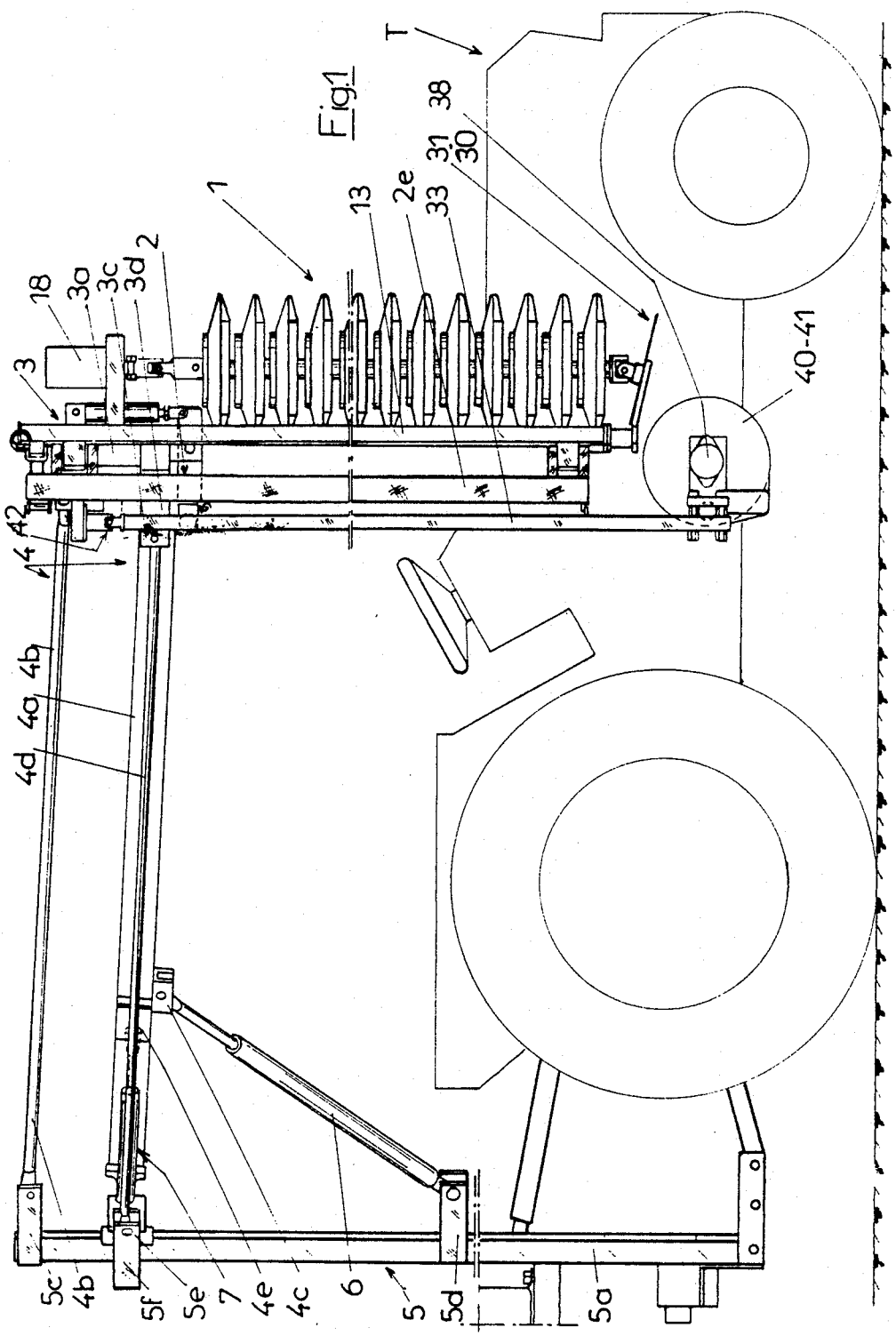
FIG. 1 is a side view of an example of construction of the machine according to the invention, shown mounted on an agricultural tractor.
Figure 2:
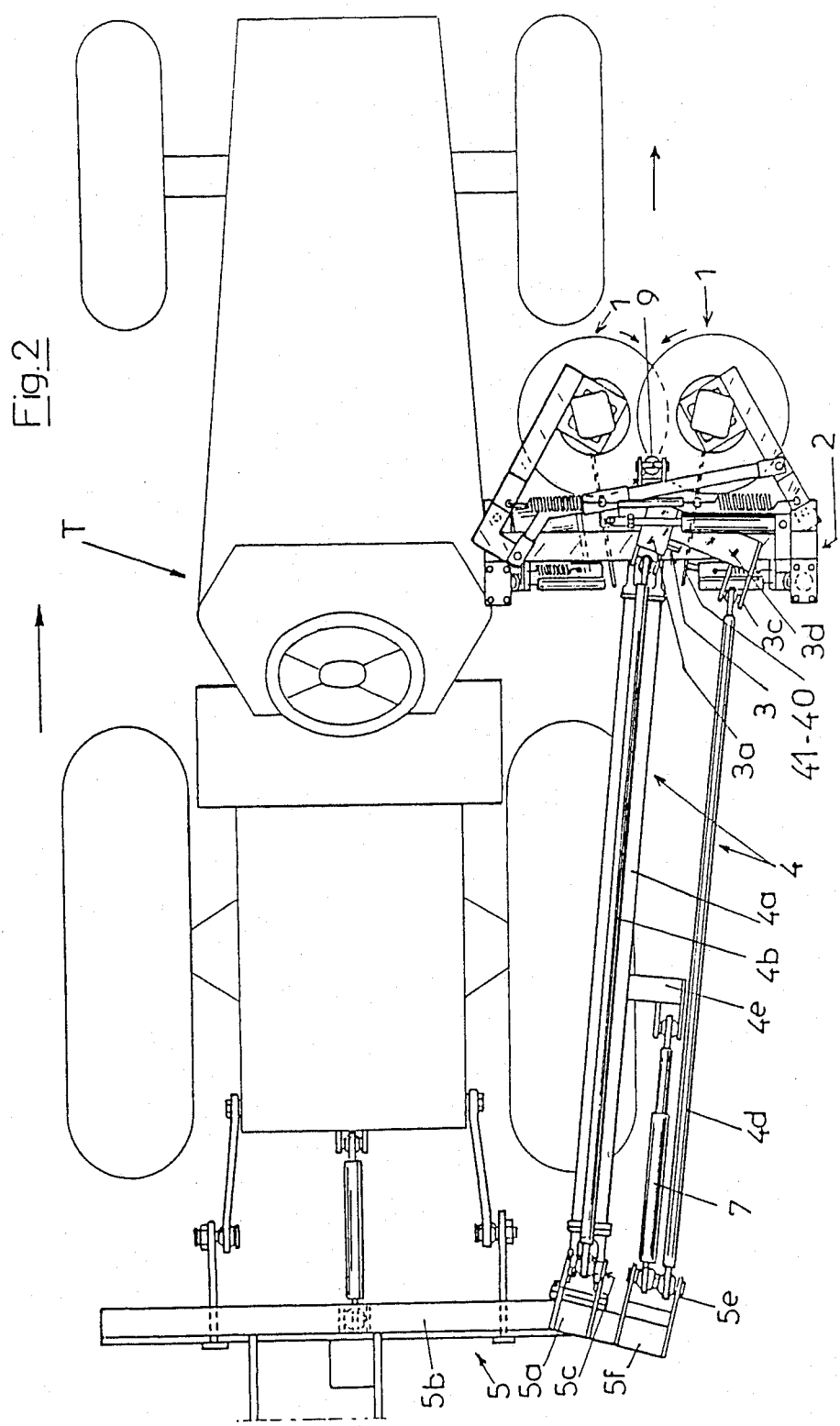
FIG. 2 is a plan view of FIG. 1.
Figure 3:
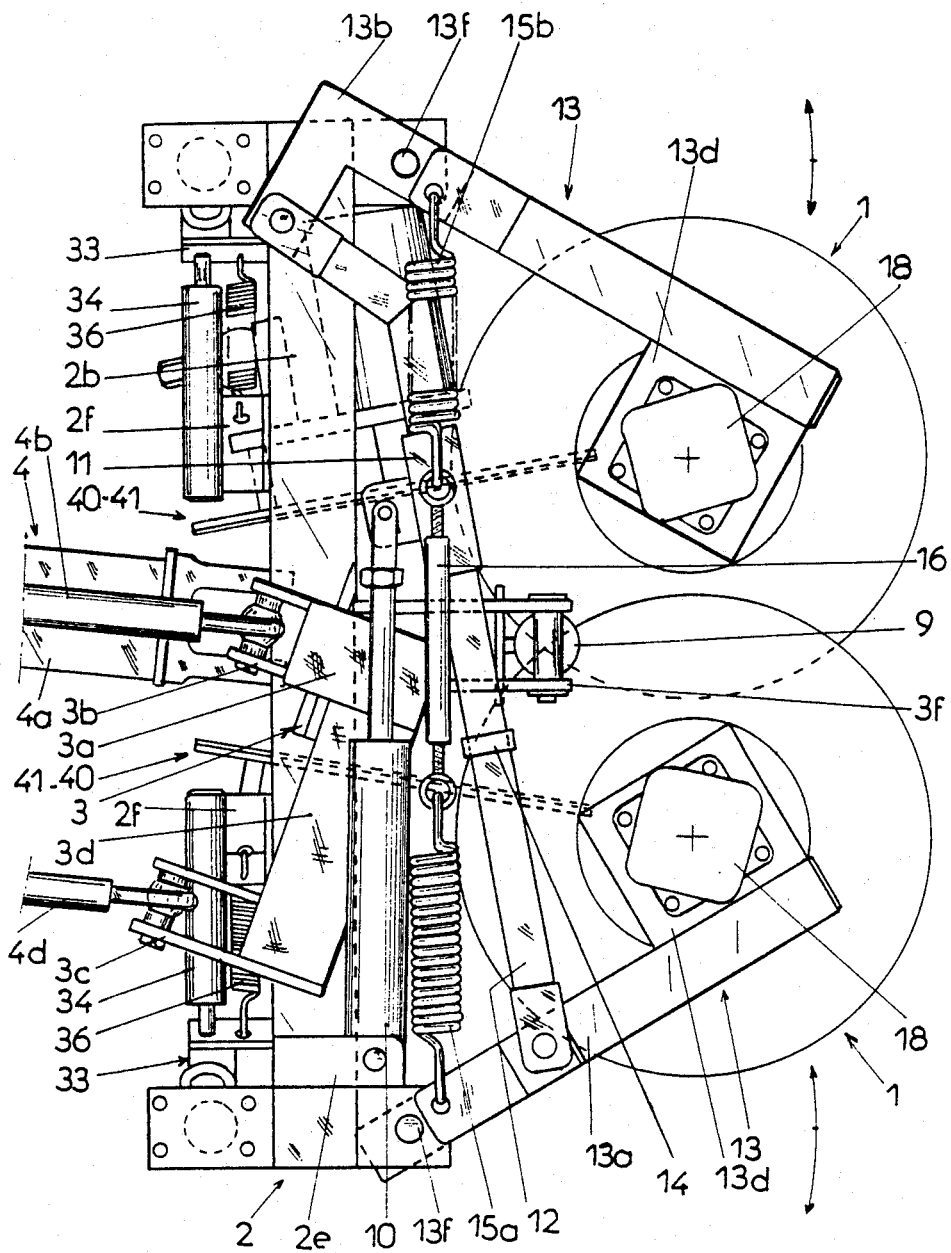
FIG. 3 is a plan view of the front part of the machine.

According to one interesting construction, the cutting machine of the invention comprises at least one cutting assembly and, preferably two cutting assemblies designated as a whole by the reference numeral 1 in FIGS. 1 and 2, this or each cutting assembly being essentially composed of a plurality of superposed cutting tools described in detail in the following part of the present disclosure. In the example illustrated, these cutting assemblies are constituted by rotary drums carried by a supporting frame 2 suspended from a support 3 mounted at one of the ends of an arm 4 supported by a robust attachment chassis 5.

The chassis 5 is arranged in such a manner as to be able to be mounted, by means of a universal three-point attachment device, on an agricultural tractor. This chassis is for example principally constructed of two rigid tubular risers 5a rigidly interconnected by means of transverse members 5b.

It carries the arm 4 mounted with a capability of pivoting in the vertical plane and in a plane perpendicular to the vertical and, for example, fixed to the upper part of one of the risers 5a of the said chassis.

The arm 4 is advantageously formed by a deformable double parallelogram system.

It comprises a first deformable parallelogram disposed in the vertical plane and constituted by: a robust tubular principal beam 4a fixed, by its opposite ends and by means of pivot cardan joints, to the riser 5a of the chassis 5 and to a vertical element 3a of the support 3, respectively, and a rod 4b pivoted, by its opposite ends and by means of spherical pivots, in an attachment member 5c carried by the upper part of the said riser and in an attachment member 3b with which is provided the said vertical element 3a of the said support.

The movements of pivoting of the support arm 4 in the vertical plane are obtained by means of a jack 6 pivoted, by its opposite ends and by means of spherical pivots, in an attachment member 5d fast with the intermediate portion of the riser 5a, and in an attachment member 4c with which the intermediate portion of the principal beam 4a is provided.

The second deformable parallelogram is disposed in a plane perpendicular to the vertical plane and it is constituted by the said principal beam 4a and by a second pivoted rod 4d pivoted by its opposite ends and by means of spherical pivots in an attachment member 5e fast with a small horizontal bracket 5f fixed in the neighbourhood of the upper end of the riser 5a, and in a second attachment member 3c with which a horizontal element 3d of the support 3 is provided.

The movements of pivoting of the support arm 4 in planes perpendicular to the vertical plane are obtained by means of a jack 7 pivoted, by its opposite ends and by means of spherical pivots, in the attachment member 5e and in an attachment member 4e provided for the intermediate portion of the principal beam 4a.

The jack 6 and the deformable parallelogram 4a-4b-5a-3a permit an adjustment of the position in height of the cutting drums 1 of the cutting head of the machine, whilst maintaining their axes in a vertical position, whilst the jack 7 and the deformable parallelogram 4a-4d-5f-3d permit an adjustment of the position of the said cutting drums with respect to the axis of advancement of the machine, whilst maintaining the axes of the said cutting drums in a plane perpendicular to the said axis of advancement.

It will be seen that the system of double deformable parallelogram constituting the support arm 4 has for its function to maintain the proper positioning of the assemblies or cutting drums with respect to the working planes of the machine.

The frame 2 carrying the cutting drums 1 is suspended from the support 3 with a latitude of pivoting of small amplitude in a vertical plane parallel to the axis of advancement of the machine. The said support frame 2 comprises, for example, a small suspension arm 2a fast with a cross-member 2b of the said frame and fixed, by means of an axis 8, in a lower attachment member 3e of the support 3. A jack 9 coupling the support 3 and the supporting frame 2 permits to bring back the axes of the cutting drums into the vertical position, this jack being for example pivoted by its opposite ends in an attachment member 2c which is presented by the suspension arm 2a at a distance from its suspension axis 8, and in an upper attachment member 3f of the support 3. The jack 9 constitutes a safety means permitting to replace the stacks of cutting tools of the cutting drums 1 in the vertical functional position, in the case where they were inclined for any fortuitous reason, for example after meeting obstacles.

Means permit the voluntary movement apart of the cutting drums 1, for example to permit the positioning of the cutting head of the machine on the initial end of a row of vines or other trained growth to be pre-pruned or pruned, and the automatic withdrawal of the said cutting drums during meeting with a stake of the fencing.

The means permitting voluntary movement apart of the cutting assemblies 1 comprise a jack 10 fixed, by its opposite ends and by means of pivots, to the upper part of one of the risers 2e of the support frame 2, and on a slide block 11 mounted on a slideway 12 comprising an offset end. This slideway is itself pivoted, by its opposite ends and in nonsymmetrical manner, on the arms 13a,13b rigidly fast with the upper part of the risers 13c of the pivoting support cradles 13 in which are mounted the cutting drums. A stop 14 carried by the slideway 12 limits the amplitude of stroke of the slide block 11.

The automatic return of the cutting drums 1 towards the centre or axis of working of the machine is assured by tension springs 15a-15b each fixed by one of its ends to one of the arms 13a,13b respectively in front of the vertical pivoting axes 13f of the support cradles 13, these springs being furthermore coupled by means of a screw tightener 16 permitting to adjust their returning force.

These springs permit also the automatic drawing back of the cutting drums 1 when meeting the stakes of the fencing, and their automatic return into operating position of approached interpenetration after having passed about the said stakes.

The shapings of the slideway 12 and of the arms 13a,13b ensure the simultaneity and the synchronism of the withdrawal and automatic return of the cutting drums.

The risers 13c of the support cradles 13 of the cutting drums 1 are mounted with a capability of pivoting about vertical or substantially vertical axes 13f, on the risers 2e of the support frame 2, for example by means of hinges 17a,17b. The support cradles 13 again comprise an upper console 13d and a lower console 13e. On the upper console there is installed the hydraulic motor 18 ensuring the driving in rotation of the subjacent cutting drum.

Each cutting drum is principally and advantageously constituted by a common shaft 19 and a plurality of superposed cutting tools 20 stacked about the said shaft. This latter is coupled, by means of movable pivots or non-rigid couplings 21,22, and in a dismountable manner, to the motor shaft 18a and to the rotary counter blade of a tool carried by the lower console 13e, and described hereinafter.

Each cutting tool 20 comprises: a rotary circular cage 23 provided with peripheral openings 23a, and a member 24 participating in the cutting action and housed at the interior of the said cage. The openings 23a are preferably with small spacing and distributed regularly on all of the periphery of the cage 23.

According to an important characteristic of the invention, the rotary circular cage 23 and the internal member 24 of the cutting tool 20 or of each cutting tool of the machine are manufactured in a complementary manner and are associated to constitute a system of blade and counter blade producing a cut by clipping action.

In an advantageous manner, the rotary cage 23 is arranged to constitute a circular counter blade, whilst the internal member 24 comprises at least one cutting blade 24a.

The cage 23 comprises a central sleeve 23b permitting its mounting on the shaft 19 to which it is assembled in rotation by means of a key 25 lodged in a longitudinal groove 19a of the said shaft and in one of two keying grooves 23k diametrically opposed on the said central sleeve.

The cage 23 comprises a central crown 23c comprising a plane surface 23c' applied against a plane surface of the internal member 24 and assembled rigidly to the central sleeve 23b.

This crown is provided peripherally with notches or cut out portions 23a' separated by teeth 23d which, according to the advantageous example of construction illustrated, form as many counter blades. Nevertheless, according to a modified construction, the edge of the teeth 23d could also be sharpened so as thus to constitute as many cutting blades, the internal member 24 being, in this case, arranged to form a counter blade.

The notches or cut out portions 23a' and the teeth 23d have respectively symmetrical profiles and comprise curved edges. The cut out portions 23a' have an enlarged entrance followed by a narrowing and terminate in a widened base.

The teeth 23d have a substantially petal-like shape and comprise a narrow end followed by a swelling and are attached to the central portion of the central crown 23c by a narrowed part.

The rotary cage 23 comprises rectilinear guiding ribs 23e, 23f disposed radially on each face of the teeth 23d and parallel to the axis thereof, the lower ribs 23f being, over one portion of their length, spaced between the said teeth in order to permit the passage of the cutting blades 24a.

The ribs 23e, 23f have respective longitudinal edges 23e' and 23f' which are straight and advantageously disposed perpendicularly to the axis of rotation of the cage 23. On the other hand, the ends 23e" and 23f" of the ribs 23e, 23f respectively are likewise straight and disposed in alignment.

Each projecting peripheral portion of the notched rotary cage 23, constituted by a tooth 23d disposed between two radial ribs 23e, 23f terminates in a flange 23g spaced in front of the said tooth and of the straight ends 23e" and 23f" of the said ribs.

By reason of the shaping of the ribs 23e, 23f and of the provision of the flange 23g, the wires F of the fencing readily jump from one inter-tool space to another, before they take up a critical inclination leading them to engage into a notch 23a–23a', which thus eliminates all risk of cutting of the said wires by the cutting tools, when these do not have an ideal spacing and tension, which is practically always the case.

The internal ends of the guiding ribs 23e,23f are rigidly assembled respectively to cylindrical envelopes 23h, 23i.

In an advantageous manner, the internal member 24 of the cutting tool according to the invention comprises a plurality of cutting blades 24a (or, alternatively, a plurality of counter blades) disposed on an arc of a circle corresponding substantially to its forward half-periphery, the said member being able in this case to be constituted of several sectors fixed, for example by screwing, on blade carriers 26.

This latter and, consequently, the blades 24a are mounted with a capability of angular movement of limited amplitude. The blade carriers 26 comprise an axial bore 26a by means of which it is mounted about the sleeve 23b of the cage 23. A bush 27 is interposed between the said sleeve 23b and the cylindrical wall of the bore 26a.

The device limiting the amplitude of angular movement of the blades is, for example, constituted by a lever 28 rigidly fixed under the blade carriers 26 and largely extending from the periphery of the cage 23, this lever bearing against the upright 13c of the support cradle 13 and, for this reason, preventing the complete rotation of the assembly: blade carriers 26 and blades 24.

The cutting tools 20 of each cutting assembly 1 made in this manner are stacked one upon another, with the interpolation of cylindrical spacing stays 29 centred in annular notches of the ends of the central sleeve 23b of the cages 23.

The blade carriers 26 comprise an annular skirt 26b disposed coaxially to their axial bore 26a and of which the base enters, with a small play, into the cylindrical envelope 23h of the sub-jacent cages.

The blade carrier 26 and its annular skirt 26b are advantageously moulded in aluminium. In this case rods of treated steel 23j are implanted longitudinally into the circular portion of the annular skirt orientated towards the interior taking into account the axis of advancement of the machine. These rods of hard steel oppose the progressive cutting of the skirt 26b under the effect of wear by the wires of the fencing. The cutting tools 20 of each cutting assembly 1 have a position offset, in the vertical plane, with respect to the cutting tools of the other assembly. As a result, when the said assemblies or cutting drums are close together, there is obtained an interpenetration of the edges of the cutting tools of each assembly into the annular inter-tool spaces of the other cutting drum (FIG. 7).

Figure 4:
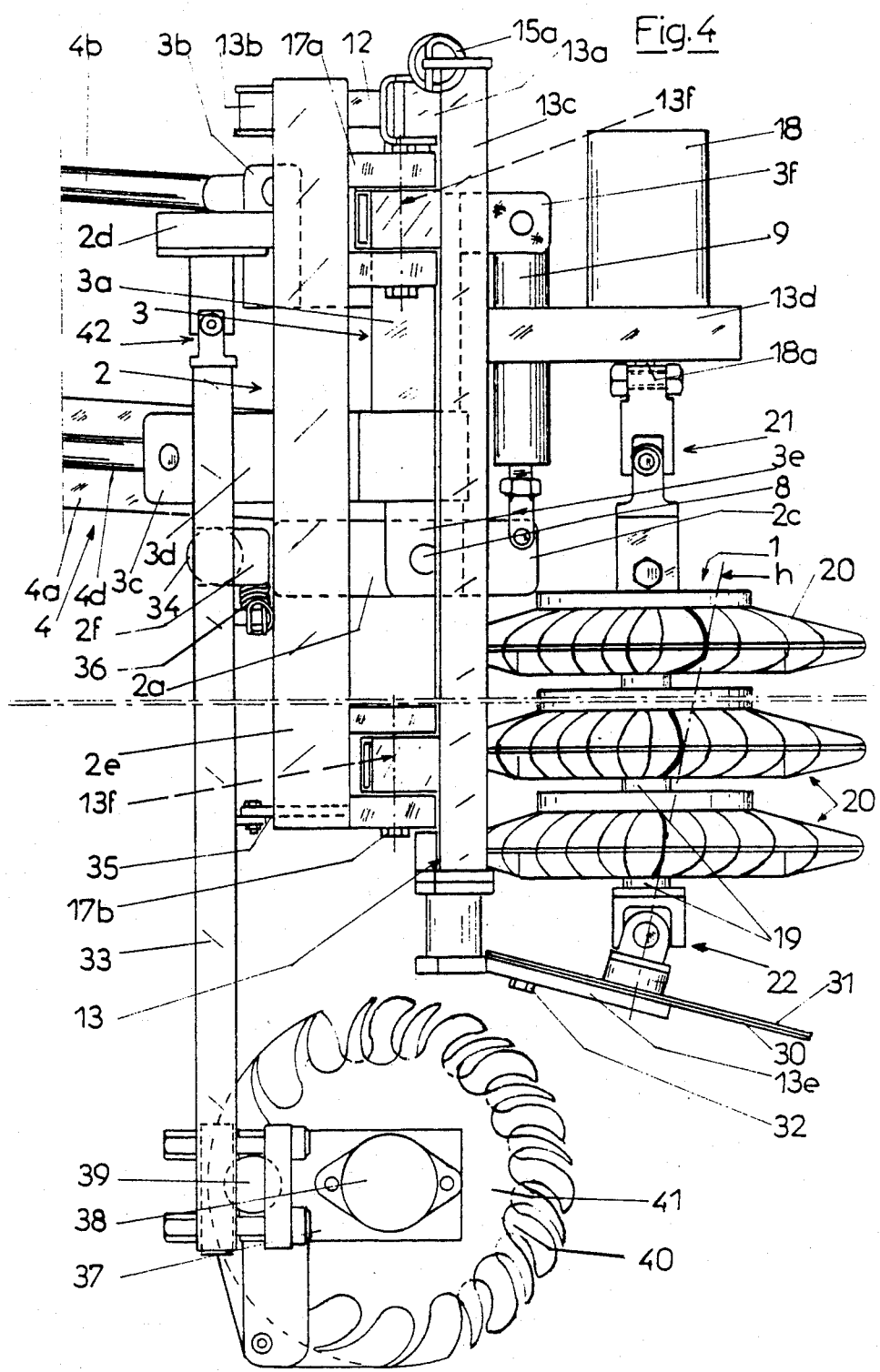
FIG. 4 is a side view of FIG. 3.
Figure 5:
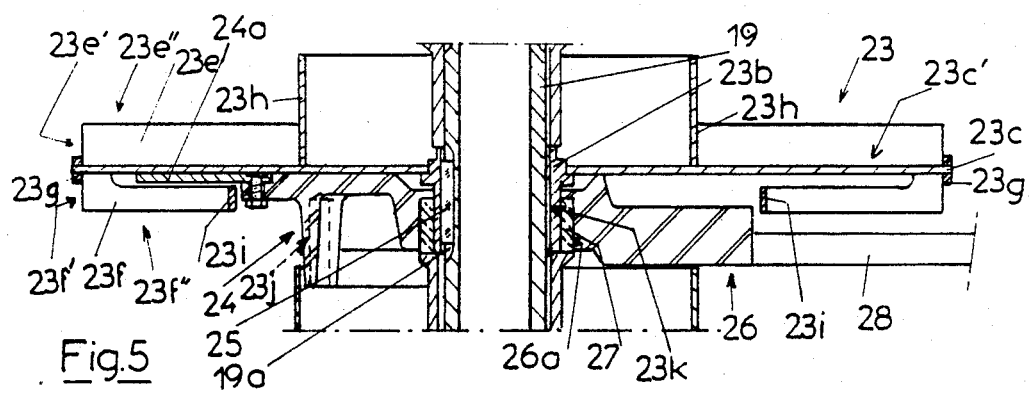
FIG. 5 is a view in axial section of a cutting tool according to the invention shown mounted on its driving shaft.

On the other hand, the peripheral notches 23a–23a' of the rotary cage 23 of each cutting tool 20 have a position offset angularly, with respect to the notches of the rotary cage of the sub-jacent and/or superposed cutting tool. The notches 23a–23a' of the stacked tools are thus disposed according to helices h (FIG. 4) in such a manner that irrespective of their section the stakes of the fencing cannot be caught up by the said notches, into which they cannot in effect enter.

The tangential speed of rotation of the rotary cages of the cutting tools 20 is substantially equal to the linear speed of advance of the tractor T carrying the machine, this relationship being obtained, for example, by means of a known hydraulic variator.

The number of cutting tools 20 stacked, that is to say the height of the cutting drums 1, can be readily adapted to the height of the wood to be eliminated: it suffices, in effect, in order to obtain such an adjustment, to uncouple the upper end of the shaft 19 and to add or to remove one or several of the said cutting tools.

There is illustrated, in FIGS. 10 to 12, a modification of construction of the cutting tools.

Figure 6:
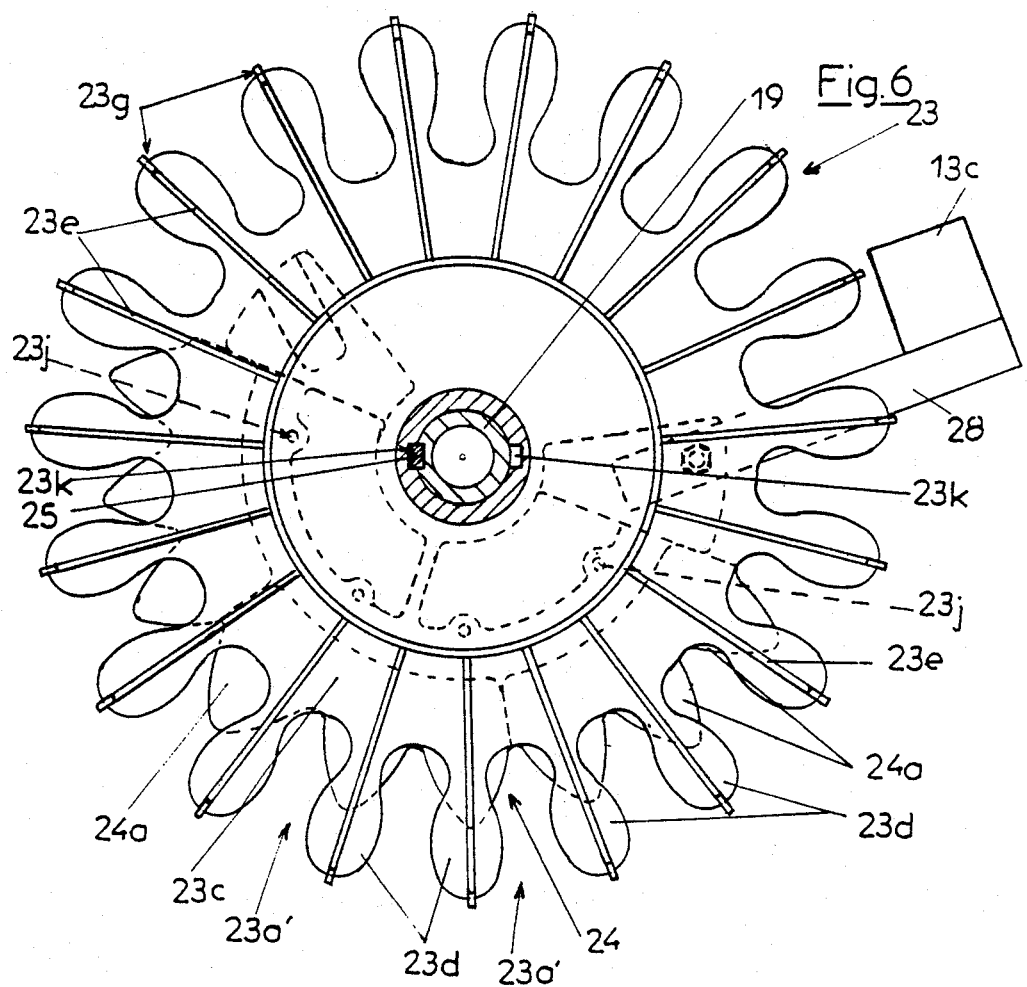
FIG. 6 is a plan view of FIG. 5.

According to this manner of construction, the notches 23a of the rotary cage have an axis a—a inclined with respect to the radius r of the rotary cage, in such a manner as to form an angle $\beta$ with respect to the said radius, in front of this latter with respect to the direction of rotation of the said cage indicated by the arrow in FIG. 6. The tooth 23d disposed behind each opening or notch 23a, taking into account the direction of rotation of the cage, constitutes a counter blade. Nevertheless, the forward edge 23d' of the teeth 23d could also be sharpened in order thus to constitute as many cutting blades, the fixed internal element 24 being, in this case, arranged to form a counter blade.

In accordance with this variation of construction the ribs 23e, 23f have a height decreasing in the direction of the periphery of the central crown 23c and form a re-entrant curve with respect to the radius r and in the direction of rotation of the cage 23. The external ends 23l, 23m of the ribs 23e, 23f respectively have a rounded shape and extend as far as the point 23d" of the teeth 23.

The cage 23 arranged in this manner has the general shape of a notched disc the external portion of which has a thickness decreasing in the direction of its periphery.

The lower console 13e of the support cradles 13 is inclined towards the front and, on this console, there is mounted with a corresponding inclination a lower cutting member constituted by a fixed knife 30 and a rotary counter blade 31 disposed coaxially above the said knife. This has a circular shape and it comprises a plurality of cutting blades 30a distributed regularly on an arc of circle corresponding substantially to its half-periphery at the front.

The cutting blades 30a are preferably mounted unitarily, in removable manner, on a blade carrier 30b and fixed, for example by screwing, against the lower face thereof. The fixed knife thus formed is immobilised in rotation by fixing it on the console 13a, for example by means of a screw or bolt 32. The rotary counter blade likewise has a circular shape and it is provided with peripheral notches 31a separated by teeth 31b forming as many counter blades. The teeth 31b of the counter blade are likewise preferably mounted in removable manner, on a tooth carrier 31c and fixed, for example by screwing, against the lower face of this latter. The rotary counter blade made in this way is driven in rotation by means of the shaft 19 at the lower end of which it is coupled by means of the movable joint 22.

The machine according to the invention further comprises lateral cutting members. Each of these members is installed at the lower end of an arm 33 suspended, by means of a movable articulation or non-rigid coupling 42, to a bracket 2d rigidly fast with the upper part of the risers 2e of the support frame 2.

Jacks 34 fixed to a fixed element 2f of the frame 2 and bearing, by the external end of their rod, against the suspended arms 33, permit these latter to pivot in the direction towards the exterior with respect to the axis of advance of the machine and, consequently, to separate the lateral cutting members carried by the lower end of the said arms. These jacks are mounted in parallel with the jack 10 permitting the voluntary separation of the cutting drums 1.

In its lower part, each arm 33 is coupled to the adjacent riser 2e by means of a pivoted connecting rod 35 pivoted by its opposite ends on the said arm and on the said riser respectively.

The connecting rods 35 have as their function to impose a circular movement to the arms 33 when these latter are separated under the action of the jacks 34, or when they withdraw automatically during meeting with obstacles, which has for its interesting result to assist the disengagement of the lateral cutting members from the entanglements of wood in which they can find themselves.

Tension springs 36 fixed, by their opposite ends, on the suspended arms 33 and on a fixed element 2f of the frame 2 ensure the automatic return of the said arms and, consequently, of the lateral cutting members, in the direction of the centre of the machine.

The lateral cutting members are carried by platens 37 fixed at the lower end of the arms 33 and on the external side of which is installed the hydraulic motor 38 serving for driving in rotation of the rotary element of the said cutting members.

The platens 37 are mounted on the arms 33 by means of a ball joint 39 permitting the adjustment of the orientation of the lateral cutting members carried by the said platens.

These latter are constituted, in a manner analogous to that of the forward lower cutting members 30–31, by a fixed knife 40 and a rotary circular counter blade 41 disposed against the internal face of the said knife. This latter comprises a plurality of removable cutting blades distributed regularly only on an arc of a circle corresponding substantially to its forward half-periphery, whilst the rotary counter blade mounted on the output shaft of the motor 38 is provided with notching distributed regularly about all of its periphery and separated by removable teeth constituting a plurality of counter blades.

It is pointed out that the absence of blades in the rear part of the fixed knives 30 and 40 of the lower and lateral cutting members has for its advantage to eliminate all risk of cutting of the wires of the fencing. It is also pointed out that these cutting members, by reason of their arrangement, permit the carrying out of a very neat cutting of the wood, comparable to that which is obtained with the aid of secateurs, such that it can be accepted as a pruning operation not needing any subsequent manual re-working.

On the other hand, it will be noted that the fixed element 30,40 of the lower cutting members and the lateral cutting members are disposed at the side of the wood (carrying) which remains attached to the plant or bush after the cut, whilst the rotary element 31,41 of the said members is placed to the side of the wood cut. By reason of this positioning, the wood which remains cannot be broken by the said cutting members.

We claim:

1. A cutting machine, for use in agriculture, viticulture, and arboriculture, comprising a cutting tool including:
   (i) a rotatable circular cage having radially extending teeth bounding indentations in its periphery,
   (ii) a member taking part in the cutting action and disposed within said cage and extending radially outwardly over at least a part of said indentations, said teeth and said member coacting for cutting of material introduced into said indentations, and
   (iii) motor means coupled to said cage for rotating it.

2. A cutting machine, as claimed in claim 1, wherein said teeth are formed as a counterblade, and said member is formed as a cutting blade.

3. A cutting machine, as claimed in claim 1, wherein said rotatable cage comprises a crown in which said teeth and indentations are formed, said crown having a plane surface, and wherein said member has a plane surface against which the plane surface of the crown is applied.

4. A cutting machine, as claimed in claim 3, wherein said teeth have a substantially petal-like shape with curved edges and with a narrow outer end merging into a wider central part joined by a narrow neck to a central portion of the crown.

5. A cutting machine, as claimed in claim 4, comprising guiding ribs disposed radially on each face of said crown along said teeth, and a flange disposed at the end of each tooth and the ribs thereof.

6. A cutting machine, as claimed in claim 5, wherein said ribs have linear radial edges and linear peripheral end edges.

7. A cutting machine, as claimed in claim 5, wherein said ribs have their axial height decreased in the direction towards the periphery of the crown, and terminate in a rounded outer end.

8. A cutting machine, as claimed in claim 1, wherein each indentation has a longitudinal axis which is inclined, in the plane of rotation of the cage, with respect to a radius of the cage, such that the peripheral end of said indentation leads, considered in the direction of rotation of the cage.

9. A cutting machine, as claimed in claim 1, wherein said member comprises a plurality of blades disposed on an arc of a circle coaxial with said cage.

10. A cutting machine, as claimed in claim 1, comprising a support cradle carrying said cutting tool, said member being angularly movable, within limits, with respect to said support cradle.

11. A cutting machine, as claimed in claim 1, comprising a cutting assembly with a plurality of said cutting tools stacked coaxially.

12. A cutting machine, as claimed in claim 11, wherein said cutting tools are stacked on a common shaft.

13. A cutting machine, as claimed in claim 12, wherein said rotary cage of each cutting tool comprises a central sleeve by means of which said cage is mounted on its shaft and is secured thereon.

14. A cutting machine, as claimed in claim 13, wherein separating means are disposed between the stacked cutting tools.

15. A cutting machine, as claimed in claim 11, wherein the teeth and indentations of the rotary cage of each tool are angularly offset with respect to those of a next tool of the stack.

16. A cutting machine, as claimed in claim 1, comprising two cutting assemblies, each such assembly having a plurality of cutting tools stacked on a respective shaft.

17. A cutting machine, as claimed in claim 16, wherein during operation an outer peripheral portion of each cutting tool of the one cutting assembly is interposed in a space defined between outer peripheral portions of adjacent cutting tools of the other cutting assembly.

18. A cutting machine, as claimed in claim 10, wherein said cutting assembly comprises a lower cutting tool disposed below said stacked cutting tools, said lower cutting tool being rotatable about an axis inclined with respect to the axis of rotation of the cages of the stacked cutting tools, and being coupled to said cages for rotation.

19. A cutting machine, as claimed in claim 18, wherein said lower cutting tool comprises a rotary circular element having radial teeth bounding peripheral notches, and a coaxial fixed element having a plurality of circumferentially-spaced teeth disposed on an arc of circle corresponding substantially to its front half-periphery.

20. A cutting machine, as claimed in claim 17, comprising a pivotable support cradle carrying said two cutting assemblies and permitting movement of said assemblies radially away from each other out of their interposed condition, and return loading means urging said assemblies into their interposed condition.

21. A cutting machine, as claimed in claim 16, comprising a chassis for mounting on a vehicle, support means carrying said cutting assemblies, and a deformable double parallelogram system by which said support means is coupled to said chassis, said parallelogram system permitting movement of said support means vertically and laterally with respect to said chassis.

22. A cutting machine, as claimed in claim 21, wherein said support means comprise a carrier frame, for said cutting assemblies, said carrier frame being pivotable with small amplitude in a direction fore and aft of said chassis.

23. A cutting machine, as claimed in claim 21, comprising a pair of depending arms each pivotably coupled at its upper end to said support means, a respective lateral cutting tool mounted at the lower end of each depending arm, respective operating means coupled between the support means and each said arm for moving said arm outwardly, and respective return loading means coupled between each arm and the support means.

24. A cutting machine, as claimed in claim 23, wherein said lateral cutting tool comprises a rotary circular element having radial teeth bounding peripheral notches, and a coaxial fixed element having a plurality of circumferentially spaced teeth disposed on an arc of circle corresponding substantially to its front half periphery.

25. A cutting machine, as claimed in claim 23, wherein each lateral cutting tooth is mounted at the lower end of its arm by a ball joint permitting adjustment of its orientation.

26. A cutting machine, as claimed in claim 1, wherein the rotary circular cage of the cutting tool is driven in rotation at a circumferential speed about equal to the linear speed of advance of the machine.

27. A cutting machine, as claimed in claim 1, wherein said member disposed within said cage is mounted so as to have a capability of angular movement.

* * * * *